(12) United States Patent
Alnås et al.

(10) Patent No.: US 12,149,931 B2
(45) Date of Patent: Nov. 19, 2024

(54) METHODS AND DEVICES FOR UTILIZING AN EXPOSURE FUNCTION OF A WIRELESS COMMUNICATIONS NETWORK

(71) Applicant: Sony Group Corporation, Tokyo (JP)

(72) Inventors: Svante Alnås, Lund (SE); Rickard Ljung, Helsingborg (SE)

(73) Assignee: SONY GROUP CORPORATION, Tokyo (JP)

( * ) Notice: Subject to any disclaimer, the term of this patent is extended or adjusted under 35 U.S.C. 154(b) by 366 days.

(21) Appl. No.: 17/619,466

(22) PCT Filed: Jun. 9, 2020

(86) PCT No.: PCT/EP2020/065967
§ 371 (c)(1),
(2) Date: Dec. 15, 2021

(87) PCT Pub. No.: WO2021/004718
PCT Pub. Date: Jan. 14, 2021

(65) Prior Publication Data
US 2022/0312200 A1    Sep. 29, 2022

(30) Foreign Application Priority Data

Jul. 8, 2019   (SE) .................................... 1930241-3

(51) Int. Cl.
*H04W 12/06*     (2021.01)
*H04W 4/70*      (2018.01)
(Continued)

(52) U.S. Cl.
CPC ............. *H04W 12/06* (2013.01); *H04W 4/70* (2018.02); *H04W 12/08* (2013.01); *H04W 12/72* (2021.01)

(58) Field of Classification Search
CPC ....... H04W 12/06; H04W 4/70; H04W 12/72; H04W 12/08
(Continued)

(56) References Cited

U.S. PATENT DOCUMENTS

2018/0109929 A1* 4/2018 Ly ........................... H04W 4/06
2018/0324271 A1* 11/2018 Leroux ................. H04L 67/101
(Continued)

FOREIGN PATENT DOCUMENTS

| WO | 2017143047 A1 | 8/2017 |
|----|---------------|--------|
| WO | 2017173259 A1 | 10/2017 |
| WO | 2018229528 A1 | 12/2018 |
| WO | 2018232253 A1 | 12/2018 |
| WO | 2019080070 A1 | 5/2019 |

OTHER PUBLICATIONS

International Search Report and Written Opinion from corresponding International Application No. PCT/EP2020/065967, mailed on Aug. 17, 2020, 9 pages.

(Continued)

Primary Examiner — Mark G. Pannell
(74) Attorney, Agent, or Firm — Tucker Ellis LLP (57) ABSTRACT

An application server may access a wireless communications device via an exposure function of a wireless communications network. The wireless communications network may generate suitable information to identify, access, and/or utilize the exposure function to manage the wireless communications device. The information may include a device identifier that identifies the wireless communications device, a node identifier that identifies a network node associated with the exposure function, and/or security information utilized to authenticate access to the exposure function. The wireless communications device may provide some or all of the information to an application server. The application server, in turn, may utilize the information received from the (Continued)

wireless community cations device to access the exposure function and manage the wireless communications device.

16 Claims, 6 Drawing Sheets

(51) Int. Cl.
*H04W 12/08* (2021.01)
*H04W 12/72* (2021.01)

(58) Field of Classification Search
USPC .......................................................... 455/411
See application file for complete search history.

(56) References Cited

U.S. PATENT DOCUMENTS

| 2019/0028866 A1* | 1/2019 | Baek ................... H04L 65/1063 |
| 2019/0281116 A1 | 9/2019 | Yang et al. |
| 2020/0120478 A1* | 4/2020 | Kim ................... H04W 52/0248 |
| 2020/0275374 A1* | 8/2020 | Kamei ................... H04W 76/28 |
| 2022/0158903 A1* | 5/2022 | D'Acunto ........... H04L 63/0876 |

OTHER PUBLICATIONS

Office Action and Search Report from corresponding Swedish Application No. 1930241-3, mailed on Mar. 16, 2020, 7 pages.

\* cited by examiner

METHODS AND DEVICES FOR UTILIZING AN EXPOSURE FUNCTION OF A WIRELESS COMMUNICATIONS NETWORK

TECHNICAL FIELD

The technology of the present disclosure relates generally to operations of a network node, a wireless communications device, and/or an application server in a wireless communications network and, more particularly, to methods and apparatus for utilizing an exposure function of the wireless communications network.

BACKGROUND

In existing wireless communications systems (e.g., 3G or 4G-based systems), exposure functions of wireless communications networks, such as a Service Capability Exposure Function (SCEF) in legacy systems or a Network Exposure Function (NEF) in 5G systems, may communicate with applications servers, which may be external to the wireless communications networks. For instance, an application server may be an Internet-of-Things (IoT) application server that utilizes various devices attached to a wireless communications network for communication. Via exposure functions, the IoT application server may manage those devices. For example, the IoT application server and the wireless communications network may exchange information, via the exposure function, related to a location of an IoT device, expected traffic behavior of the IoT device, mobility behavior of the IoT device, etc. This type of access to the network, however, may be predicated on a pre-configuration of the devices and/or the application server and, further, may be subject to agreements between a provider of the IoT service and one or more network operators.

SUMMARY

In legacy systems, information known to a wireless communications device or user equipment (UE) may be utilized by an application server to identify an operator network associated with the UE. The operator network, however, may utilize different information to identify a subscription associated with access to the network. This information may or may not be available to the UE, depending on a nature of the device. The application server may need prior knowledge of both sets of information in order to manage the UE via an exposure function of the operator network. Accordingly, pre-configuration and service agreements are often required.

The disclosed approach provides a technique to access and utilize an exposure function of a wireless communications network. The wireless communications network may generate suitable information to identify, access, and/or utilize the exposure function to manage a wireless communications device. The information may include a device identifier that identifies the wireless communications device, a node identifier that identifies a network node associated with the exposure function, and/or security information utilized to authenticate access to the exposure function. The wireless communications device may provide some or all of the information to an application server. The application server, in turn, may utilize the information received from the wireless communications device to access the exposure function and manage the wireless communications device.

According to one aspect of the disclosure, a method, performed by a wireless communications device, for utilizing an exposure function of a wireless communications network includes: receiving a request response from the wireless communications network indicative of access information usable by an application server associated with the communications device to manage the wireless communications device via an exposure function of the wireless communications network.

According to one embodiment, the method further includes transmitting a request to the wireless communications network for access information usable by the application server associated with the wireless communications device.

According to one embodiment of the method, the access information includes one or more of a node identifier, a device identifier, and/or authentication information.

According to one embodiment of the method, the node identifier indicates a network node of the wireless communication network that provides an exposure function.

According to one embodiment of the method, the device identifier is a temporary identifier for the wireless communications device.

According to one embodiment of the method, the authentication information is usable by the application server to authorize access to the wireless communications network.

According to one embodiment, the method includes sending at least a portion of the access information to the application server.

According to one embodiment, the method includes sending a request to the wireless communications network to stop transmission of the access information.

According to another aspect of the disclosure, A method for exposing functions of the wireless communications network includes: determining access information usable by the application server to manage a wireless communications device via an exposure function of the wireless communications network; and transmitting a response message to the wireless communications device that is indicative of the access information.

According to one embodiment, the method includes receiving a request from the wireless communications device to provide the access information usable by the application server associated with the wireless communications device.

According to one embodiment of the method, the access information includes one or more of a node identifier, a device identifier, and/or authentication information.

According to one embodiment of the method, determining the access information includes at least one of generating a temporary identifier as the device identifier, generating security credentials, or locating a network node providing the exposure function associated with the wireless communications device.

According to one embodiment, the method includes receiving a service request from the application server, the service request being based at least in part on the access information; and a service response to the application server.

According to one embodiment the method, the service request is received at a network node providing the exposure function, the network node indicated by the node identifier.

According to one embodiment of the method, the service request relates to management of the wireless communications device, which is identifiable by the device identifier.

According to one embodiment, the method includes receiving a request from a wireless communications device to stop transmission of the access information.

According to another aspect of the disclosure, a method for accessing functions of a wireless communications network includes: receiving, from a wireless communications device, access information for an exposure function of a wireless communications network; and transmitting a service request to a network node providing the exposure function for the wireless communications device, the network node being indicated in the access information.

According to one embodiment of the method, the service request indicates the wireless communications device via a temporary device identifier provided in the access information.

According to one embodiment of the method, the service request includes authentication information provided in the access information.

According to another aspect of the disclosure, a wireless communications device configured to operate in a wireless communications network includes a wireless interface over which wireless communications with one or more network nodes are carried out; and a control circuit configured to receive a request response from the wireless communications network indicative of access information usable by an application server associated with the communications device to manage the wireless communications device via an exposure function of the wireless communications network.

According to one embodiment of the wireless communications device, the control circuit is further configured to transmitting a request to the wireless communications network for access information usable by the application server associated with the wireless communications device.

According to one embodiment of the wireless communications device, the access information includes one or more of a node identifier, a device identifier, and/or authentication information.

According to one embodiment of the wireless communications device, the node identifier indicates a network node of the wireless communication network that provides an exposure function.

According to one embodiment of the wireless communications device, the device identifier is a temporary identifier for the wireless communications device.

According to one embodiment of the wireless communications device, the authentication information is usable by the application server to authorize access to the wireless communications network.

According to one embodiment of the wireless communications device, the control circuit is further configured to send at least a portion of the access information to the application server.

According to one embodiment of the wireless communications device, the control circuit is further configured to send a request to the wireless communications network to stop transmission of the access information.

According to another aspect of the disclosure, a network node configured to operate in a wireless communications network includes an interface over which communications are carried out; and a processor configured to: determine access information usable by an application server to manage a wireless communications device via an exposure function of the wireless communications network; and transmit a response message to the wireless communications device that is indicative of the access information.

According to one embodiment of the network node, the processor is further configured to receive a request from the wireless communications device to provide the access information usable by the application server associated with the wireless communications device.

According to one embodiment of the network node, the access information includes one or more of a node identifier, a device identifier, and/or authentication information.

According to one embodiment of the network node, the processor, in order to determine the access information, is further configured to at least one of generate a temporary identifier as the device identifier, generate security credentials, or locate a network node providing an exposure function associated with the wireless communications device.

According to one embodiment of the network node, wherein the processor is further configured to receive a service request from the application server, the service request being based at least in part on the access information; and transmit a service response to the application server.

According to one embodiment of the network node, the network node provides the exposure function and the network node is indicated by the node identifier.

According to one embodiment of the network node, the service request relates to management of the wireless communications device, which is identifiable by the device identifier.

According to one embodiment of the network node, the processor is further configured to receive a request from a wireless communications device to stop transmission of the access information.

According to another aspect of the disclosure, an application server configured to access a wireless communications device via a wireless communications network includes an interface over which communications are carried out; and a processor configured to: receive, from a wireless communications device, access information for an exposure function of the wireless communications network; and transmit a service request to exposure function of the wireless communications network, the exposure being indicated in the access information.

According to one embodiment of the application server, the service request indicates the wireless communications device via a temporary device identifier provided in the access information.

According to one embodiment of the application server, the service request includes authentication information provided in the access information.

DETAILED DESCRIPTION OF EMBODIMENTS

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

System Architecture

Figure 1:
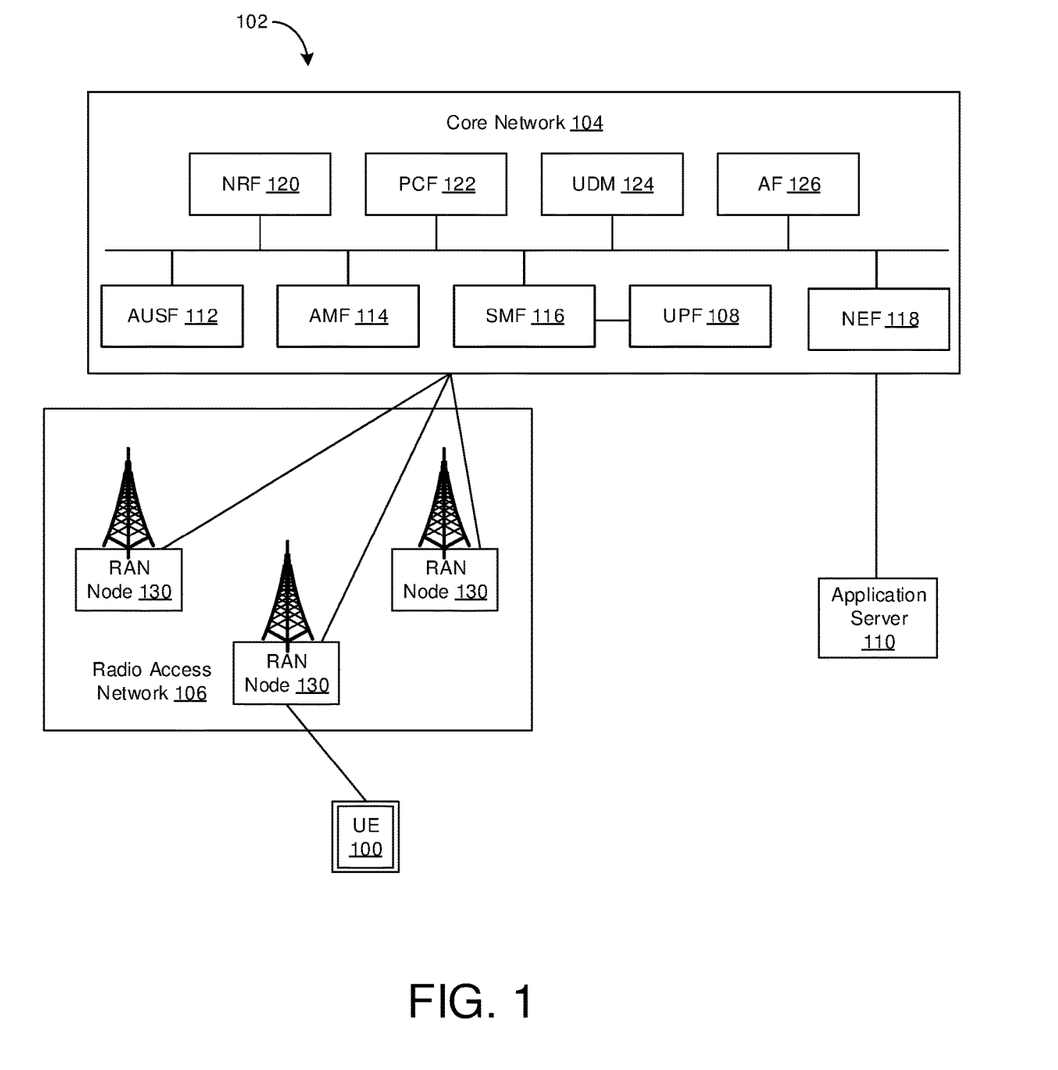
FIG. 1 is a schematic block diagram of a representative operational network environment for a wireless communications device, also referred to as a user equipment (UE).

FIG. 1 is a schematic diagram of an exemplary network environment in which the disclosed techniques are implemented. It will be appreciated that the illustrated network environment is representative and other environments or systems may be used to implement the disclosed techniques. Also, various functions may be carried out by a single device, such as by a radio access node, user equipment, core network node, or a computing device, may be carried out in a distributed manner across nodes of a computing environment or a wireless communications environment.

The network environment is relative to an electronic device, such as a user equipment (UE) 100. As contemplated by 3GPP standards, the UE may be a mobile radiotelephone (a "smartphone"). Other exemplary types of UEs 100 include, but are not limited to, a gaming device, a media player, a tablet computing device, a computer, a camera, and an internet of things (IoT) device that communicates using machine-to-machine (M2M) communications or machine-type communications (MTC). Since aspects of the disclosed techniques may be applicable to non-3GPP networks, the UE 100 may be more generically referred to as a wireless communications device or a radio communications device.

The network environment includes a wireless communications network 102 that may be configured in accordance with one or more 3GPP standards, such as a 3G network, a 4G network or a 5G network. The disclosed approaches may apply to other types of networks.

In instances where the network 102 is a 3GPP network, the network 102 includes a core network (CN) 104 and a radio access network (RAN) 106. The core network 104 provides an interface to a data network. The data network represents operator services, connection to the Internet, third party services such as application server 110, etc.

According to an embodiment, CN 104 may be, for example, a 5G core network. The core network 104 includes one or more servers that host a variety of network management functions, illustrated examples of which include, but are not limited to, a user plane function (UPF) 108, a session management function (SMF) 116, a core access and mobility management function (AMF) 114, an authentication server function (AUSF) 112, a network exposure function (NEF) 118, a network repository function (NRF) 120, a policy control function (PCF) 122, a unified data management (UDM) 124, and an application function (AF) 126. In one embodiment, the NEF 118 provides an interface to the application server 110 that may be, for example, located on the internet.

The RAN 106 includes a plurality of RAN nodes 130. In the illustrated example, there are three RAN nodes 130a, 130b, and 130c. Fewer than or more than three RAN nodes 130 may be present in the RAN 106. For 3GPP networks, each RAN node 130 may be a base station such as an evolved node B (eNB) base station or a 5G generation gNB base station. The RAN node 130 may include one or more Tx/Rx points (TRPs). Since aspects of the disclosed techniques may be applicable to non-3GPP networks, the RAN nodes 130 may be more generically referred to as network access nodes, an alternative example of which is a WiFi access point.

A radio link may be established between the UE 100 and one of the RAN nodes 130 for providing wireless radio services to the UE 100. The RAN node 130, to which the radio link is established, is referred to as the serving RAN node 130 or serving base station, or primary cell. Other RAN nodes 130 may be within communication range of the UE 100. The RAN 106 is considered to have a user plane and a control plane. The control plane is implemented with radio resource control (RRC) signaling between the UE 100 and the RAN node 130. Another control plane between the UE 100 and the core network 104 may be present and implemented with non-access stratum (NAS) signaling.

Figure 2:
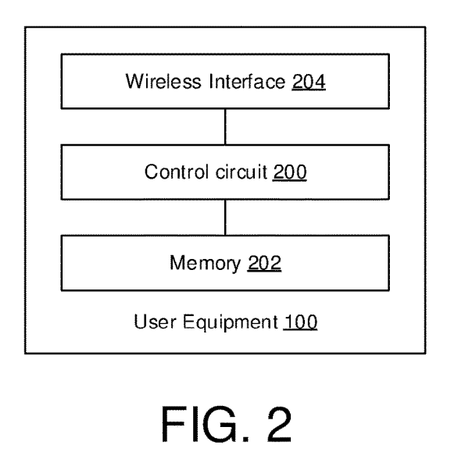
FIG. 2 is a schematic block diagram of the UE from the network environment.

With reference to FIG. 2, illustrated is a schematic block diagram of the UE 100. The UE 100 includes a control circuit 200 that is responsible for overall operation of the UE 100, including controlling the UE 100 to carry out the operations described herein. In an exemplary embodiment, the control circuit 200 may include a processor (e.g., a central processing unit (CPU), microcontroller, or microprocessor) that executes logical instructions (e.g., lines of code, software, etc.) that are stored by a memory (e.g., a non-transitory computer readable medium) of the control circuit 200 and/or a separate memory 202 in order to carry out operation of the UE 100.

The UE 100 includes a wireless interface 204, such as a radio transceiver and antenna assembly, for establishing an over the air connection with the serving base station 130. In some instances, the UE 100 may be powered by a rechargeable battery (not shown). Depending on the type of device, the UE 100 may include one or more other components. Other components may include, but are not limited to, sensors, displays, input components, output components, electrical connectors, etc.

Figure 3:
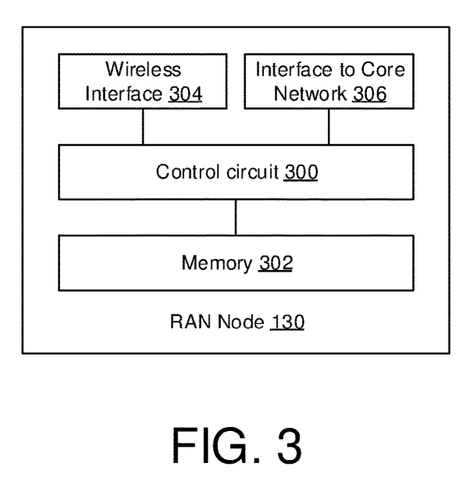
FIG. 3 is a schematic block diagram of a radio access network (RAN) node from the network environment.

With additional reference to FIG. 3, illustrated is a schematic block diagram of the RAN node 130. Each RAN node 130 typically includes a control circuit 300 that is responsible for overall operation of the RAN node 130, including controlling the RAN node 130 to carry out the operations described in herein. In an exemplary embodiment, the control circuit may include a processor (e.g., a central processing unit (CPU), microcontroller, or microprocessor) that executes logical instructions (e.g., lines of code, software, etc.) that are stored by a memory (e.g., a non-transitory computer readable medium) of the control circuit 300 and/or a separate memory 302 in order to carry out operation of the RAN node 130.

The RAN node 130 also includes a wireless interface 304 for establishing an over the air connection with the UE 100. The wireless interface 304 may include one or more radio transceivers and antenna assemblies to form the TRP(s). The RAN node 130 also includes an interface 306 to the core network 104. The RAN node 130 also includes an interface (not shown) to one or more neighboring RAN nodes 130 for conducting network coordination in the RAN 106.

Figure 4:
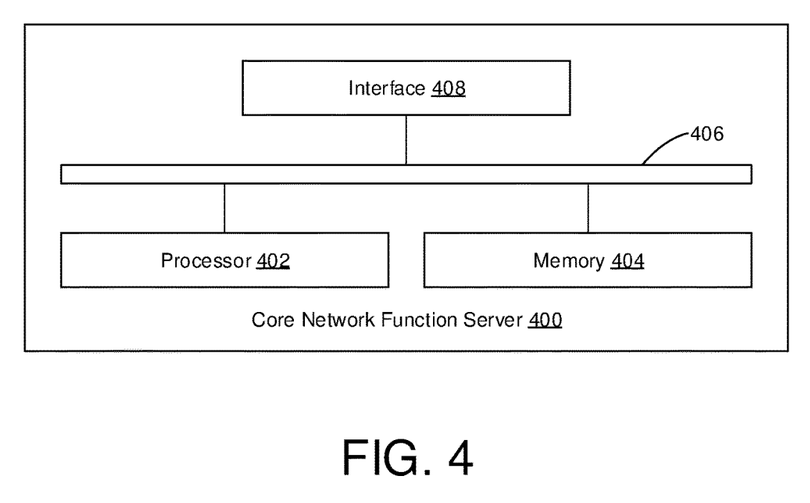
FIG. 4 is a schematic block diagram of a core network function server from the network environment.

With additional reference to FIG. 4, illustrated is a schematic block diagram of a core network function server 400 of the core network 104 that executes logical instructions (e.g., in the form of one or more software applications) to carry out one or more of the functions of the core network 104. It will be understood, however, that aspects of the one or more functions may be distributed across nodes of a computing environment.

The server 400 may be implemented as a computer-based system that is capable of executing computer applications (e.g., software programs) that, when executed, carry out functions of the server 400. As is typical for a computing platform, the server 400 may include a non-transitory computer readable medium, such as a memory 404 that stores data, information sets and software, and a processor 402 for executing the software. The processor 402 and the memory 404 may be coupled using a local interface 406. The local interface 406 may be, for example, a data bus with accompanying control bus, a network, or other subsystem. The server 400 may have various input/output (I/O) interfaces for operatively connecting to various peripheral devices, as well as one or more communications interfaces 408. The communications interface 408 may include for example, a modem and/or a network interface card. The communications interface 408 may enable the server 400 to send and receive data signals to and from other computing devices in the core network 104, RAN nodes 130, application server 110, and/or other locations as is appropriate.

In accordance with an embodiment, application server 110 may have similar structure to server 400 described above. That is, while application server 110 may not be included in core network 104 in some embodiments, the application server 110 may include a processor, a memory, and a communications interface as described above. In such cases, the application server 110 may include computer-executable instructions for carrying out functions of the application server 110, such as, for example, providing an IoT service.

Exposure Function Configuration

As described above, legacy systems typically involve application servers having knowledge of which subscription a UE is utilizing to access a wireless communications network in order to manage the UE via an exposure function. From an operator network perspective, access is subscription-based and a subscription may be associated with a mobile station international subscriber directory number (MSISDN). The MSISDN may be, for example a phone number. Accordingly, with legacy systems, an application server typically utilizes the MSISDN to access the exposure function.

In some applications, for example IoT applications, a service provider may allow any universal integrated circuit card (UICC) to be inserted into a UE, such as an IoT device. Such UEs may not be restricted to a preselected subscription to a single operator. Thus, the application server may not know which operator controls the appropriate exposure function needed to manage the UE. To illustrate, a virtual operator having its own exposure function may be identifiable only by a Group Identifier 2 (GID2) on the UICC. Some operators, however, may have different exposure functions for different subscriptions and, thus, simply identifying the operator may be insufficient to locate the appropriate exposure function.

Still further, some UEs (e.g. IoT) may not have capabilities allowing for manual configuration of subscription information. For instance, a mobile country code (MCC), a mobile network code (MNC), an international mobile subscriber identity (IMSI), etc. may be available to the UE (e.g. stored on the UICC). As described above, however, the operator network, e.g. NEF 118, utilizes the MSISDN as an identifier. The MSISDN may not be known in the UE and it usually not signaled from the operator network to the UE. Without configuration capabilities, the MSISDN may not be manually provided to the UE.

Further yet, even with configuration capabilities, there are additional concerns with using an MSISDN as an identifier to utilize exposure functions of networks. For example, due to privacy issues, it should not be possible to cross reference an identifier in an application layer with other services. Such an ability to cross reference allows the possibility to track a user over time and/or combine user behaviors or usage of different application. The MSISDN may be used in this manner if shared between different services. Moreover, access via exposure functions may be tied to a service level agreement (SLA) so that some pre-configuration of application servers is needed. For instance, predetermined security procedures may be utilized. An IoT service provider may not have such agreements with all operators, which inhibits generic usage of functions available via the exposure function.

Still further, different UEs may utilize the same subscription (e.g. the same MSISDN). Accordingly, from the perspective of the application server, it may be possible to identify the appropriate exposure function and to provide an identifier recognizable to the exposure function. However, since the subscription is shared, management of a particular device may be difficult.

Various embodiments are described herein related to operation and management of a UE 100 configured to run an application which involves communication, at least in the uplink, with an application server 110. Wireless transmission of signals and particularly data from a UE 100 is associated with powering a modem, and in many scenarios this is something that should be carried out moderately, in terms of inter alia transmit power, transmission time and transmission occasions, for the purpose of saving energy. This is particularly true if the UE 100 is a device that is rarely charged, such as an IoT device. It may be recognized that for some types of application services, characteristics or information related the type of data that the UE 100 is configured to transmit to an application server 110 may already be known, completely, partly or approximately, in a wireless communication network 102 to which the UE belongs, such as an NR network 102 to which the UE 100 is registered. As a non-limiting example, the UE 100 may be configured to upload position or location information to the application server 110, to provide a service of tracking of the UE 100, e.g. for monitoring delivery of goods. The position data may e.g. be obtained in the UE 100 by means of a GNSS receiver. As another example, the data which the UE 100 is to provide to the application server is related to a level of mobility. This may e.g. be established in the UE 100 by repeated position measurements, and/or by means of inertial sensors such as an accelerometer and/or a magnetometer. As noted, certain information associated with the data that the UE 100 is set to deliver to the application server 110 within the application service may however be available in the wireless network 102. This may e.g. relate to position of the UE 100, which may be represented as a last used RAN node 130. In an NR scenario in the mm wave spectrum, where the access node 130 is further configured to operate a beam sweep using various spatial filters, a direction with respect to the access node 130 for communication with the UE 100 may also be obtained in the network 102 to provide further detail to the position information. Other information that may be available in the network 102 may include a level of mobility, such as a succession of RAN nodes passed or a change of spatial filters or beams of one access node 130, during a certain time period. In scenarios where the information available within the wireless network 102 is sufficient for application to provide a reasonable service, it may be beneficial to obtain that information in the application server 110. This way, upload of data directly from the UE 100 may be required less frequently, or completely dispensed with. Configuration of the UE 100 to set rules or schemes for data upload may be set by the application server 110, or by a predetermined configuration, based on the resources or capability of the network 102 to provide the information, e.g. related to position or mobility, to the application service.

Techniques will be described for providing information that may be used to access and utilize an exposure function of a wireless communications network. For instance, the information may be generated by the wireless communications network and provided to a UE. The UE, in turn, can send the information to an application server. The application server utilizes the information to connect to the appropriate exposure function to operate and/or manage the UE. The technique described herein increases system flexibility as it allows individual UEs to connect to an operator network and to be managed by an application via an exposure function of the operator network without pre-configuration (e.g. without prior agreements in place between the operator and service provider).

For example, an application running on an IoT device (e.g. UE 100) that includes a UICC should be able to connect to an application server (e.g. application server 110) associated with an IoT service provider. From the perspective of the IoT service provider, this connection should be available regardless of the UICC inserted into the IoT device. To provide this communication generically, the IoT device may retrieve access information from a wireless communications network (e.g. network 102). The IoT device may send that information to the application server. The application server may utilize that information to identify and/or access an appropriate exposure function (e.g. NEF 118 of CN 104). In an embodiment, the access information may include an identification of the exposure function that handles the IoT device. The access information may also include a temporary identification for the IoT device. A temporary identifier limits traceability. Further, the access information may also include security credentials to access the IoT device via the exposure function. It is to be appreciated that the above types of information are exemplary, and that other information may be additionally or alternatively included. In general, the access information may enable the application server to identify the appropriate exposure function for the IoT device. Further, the access information may include sufficient information to identify the IoT device via the exposure function and/or authorize access via the exposure function.

Figure 5:
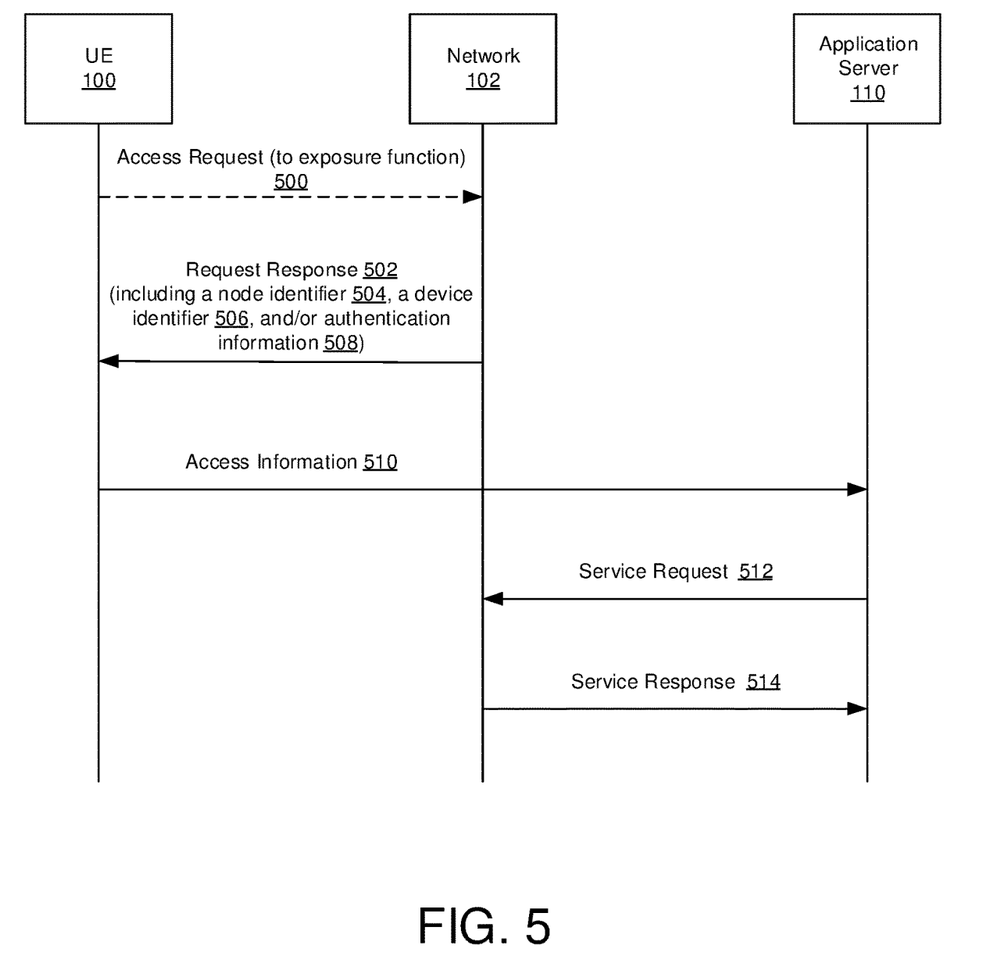
FIG. 5 is a signaling diagram of an exemplary procedure to access an exposure function of a wireless communications network.

Turning to FIG. 5, an exemplary signaling diagram for accessing and utilizing an exposure function of a wireless communications network to manage a wireless communications device is provided. As shown in FIG. 5, UE 100 (e.g. an IoT device) can send an access request 500 to wireless communications network 102. The access request 500, for example, may be a request for access via an exposure function to enable management of UE 100 via application server 110 (e.g. an IoT application server associated with an IoT service provider). In an embodiment, the access request 500 may be sent via a NAS message to a network node (e.g. server 300) of network 102. The network node that receives the access request 500 may be a node associated with the exposure function (e.g. NEF 118) or another node of network 102.

In response to the access request 500, the network 102 sends a request response 502 to UE 100. The response 502 may be a NAS response to the NAS message containing the access request 500. According to various embodiments, the response 502 may include a node identifier 504, a device identifier 506, and/or authentication information 508. The node identifier 504 may identify NEF 118 (e.g. the exposure function) handling UE 100. For instance, the node identifier 504 may include a universal resource identifier (URI) of NEF 118. The device identifier 506 may identifier UE 100. In one example, the device identifier 100 may be a temporary identifier assigned to UE 100 for a communication session or for a particular period of time. The authentication information 508 may include credentials, which may or may not be UE specific, that authorize and authenticate subsequent accesses via the exposure function. The authentication information 508 may include secret keys or other security tokens and may be temporary authorizations to access UE 100 via the exposure function.

UE 100 can send access information 510 to application server 110 via proprietary signaling (e.g. an API), for example. The access information 510 can include the node identifier 504, the device identifier 506, the authentication information 508, or portions thereof. Using the access information 510, the application server 110 may send a service request 512 to network 102. In particular, the application server 110 may send the service request 512 to an exposure function specified by the node identifier 502 such as, for example, NEF 118. The service request 512 may also include the device identifier 506 and/or the authentication information 508.

The service request 512 may be a request for a location of UE 100, a request for information regarding expected traffic patterns and/or mobility behavior of UE 100, and/or a request that provides information to network 102 regarding potential data traffic between UE 100 and application server 110. The network 102 may send a service response 514 to the application server 110 in response to the service request 512. The service response 514 may include requested service information such as, for example, a location of UE 100, traffic information, mobility information, etc. Depending on the service request 512, the service response 514 may fulfill that request. For instance, some access may not be available for a particular subscriber. The exposure function, based on the device identifier 506 and/or the authentication information 508, may determine whether the service request 512 can be satisfied. In another embodiment, the access request 500 may not needed. For instance, the network 102 may send one or more of the node identifier 504, the device identifier 506 and/or the authentication information 508 to the UE 100 unprompted. In this embodiment, the UE 100 may send a request (e.g. a NAS message) to the network 102 to halt such automatic transmissions.

Figure 6:
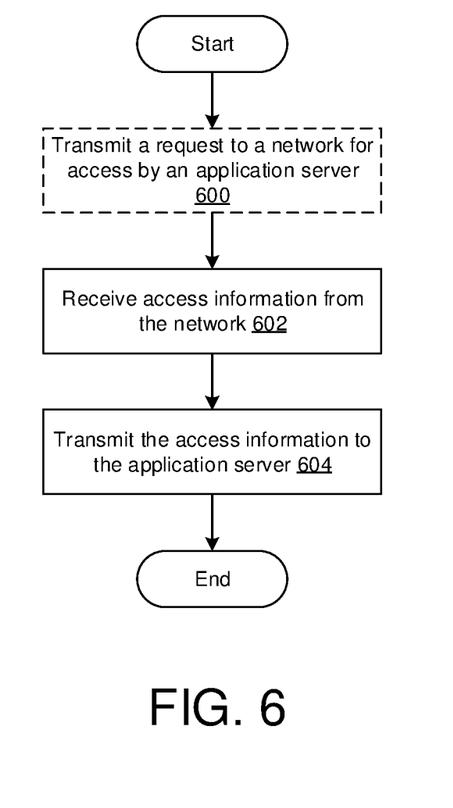
FIG. 6 is a flow diagram of a representative method for utilizing an exposure function of a wireless communications network, performed at a wireless communications device.
Figure 7:
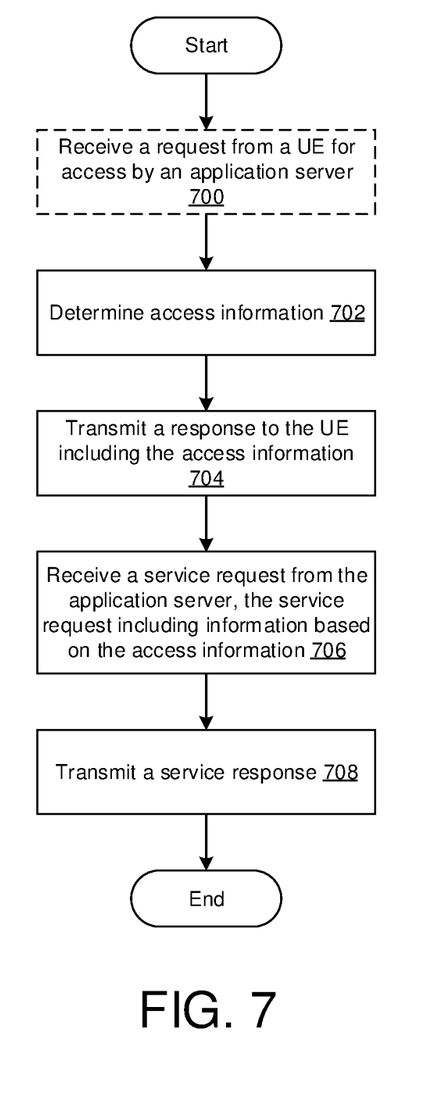
FIG. 7 is a flow diagram of a representative method for utilizing an exposure function of a wireless communications network, performed at a network node.
Figure 8:
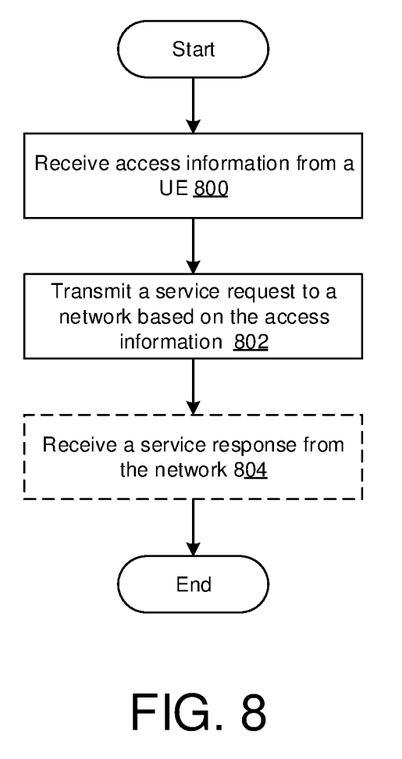
FIG. 8 is a flow diagram of a representative method for utilizing an exposure function of a wireless communications network, performed at an application server.

FIGS. 6-8 illustrate exemplary process flows representing steps that may be embodied by UE 100, network 102 (or a node 300 thereof), and application server 110. Although illustrated in a logical progression, the illustrated blocks of FIGS. 6-8 may be carried out in other orders and/or with concurrence between two or more blocks. Therefore, the illustrated flow diagrams may be altered (including omitting steps) and/or may be implemented in an object-oriented manner or in a state-oriented manner.

FIG. 6 illustrates a representative method for utilizing an exposure function of a wireless communications network. The method of FIG. 6 may be carried out by a wireless communications device, such as UE 100. The logical flow may start at block 600 where the wireless communications device may transmit an access request 500 (FIG. 5) to the wireless communications network for access to the wireless communications device, via an exposure function, by an application server. In block 602, the wireless communications device receives a request response 502 (FIG. 5) from the network. The request response may include access information including, for example, an exposure function identifier (e.g. node identifier 504), a device identifier 506, and/or security credentials (e.g. authentication information 508). In block 604, the wireless communications device may transmit the access information 510 (FIG. 5) to the application server. The wireless communications device may use proprietary messaging or API to relay the access information to the application server.

FIG. 7 illustrates a representative method for utilizing an exposure function of a wireless communications network. The method of FIG. 7 may be carried out by a wireless communications network or a node thereof, such as network 100 or node 400. The logical flow may start at block 700 where the wireless communications network receives an access request 500 (FIG. 5) from a UE for access to the UE by an application server via an exposure function. At block 702, the wireless communications network may determine access information to support such access. The access information may include, for example, an exposure function identifier, a device identifier, and/or security credentials. At block 704, a request response 502 (FIG. 5), which includes the access information, is transmitted to the UE. At block 706, the wireless communications network receives a service request 512 (FIG. 5) from the application server. The request may be received at a node hosting the exposure function identified in the access information, for example. The service request may also identify the UE for which access is sought as well as include authentication information authorizing the access. At block 708, a service response 514 (FIG. 5) may be sent to the application server. For example, the service request may be a request for a location of the UE and the service response may provide the location.

FIG. 8 illustrates a representative method for utilizing an exposure function of a wireless communications network. The method of FIG. 8 may be carried out by an application server, such as application server 110. The logical flow may start at block 800 where access information 510 (FIG. 5) is received from a wireless communication device. The access information may be received via proprietary messaging format and may include an exposure function identifier, a device identifier, and/or security credentials. At block 802, a service request 512 (FIG. 5) is sent to a wireless communications network. The service request is a request to access or manage the wireless communications device. The service request may be sent to an exposure function identified in the access information. The service request may further identify the wireless communications device and authenticate the access using information obtained in the access information. At block 804, a service response 514 (FIG. 5) is received from the wireless communications network.

Although certain embodiments have been shown and described, it is understood that equivalents and modifications falling within the scope of the appended claims will occur to others who are skilled in the art upon the reading and understanding of this specification.

The invention claimed is:

1. A method, performed by a wireless communications device, for utilizing an exposure function of a wireless communications network, the method comprising:
receiving a request response from the wireless communications network indicative of access information usable by an application server associated with the communications device to manage the wireless communications device via an exposure function of the wireless communications network.

2. The method of claim 1, further comprising transmitting a request to the wireless communications network for access information usable by the application server associated with the wireless communications device.

3. The method of claim 1, wherein the access information comprises one or more of:
a node identifier;
a device identifier; and/or
authentication information.

4. The method of claim 3, wherein the node identifier indicates a network node of the wireless communication network that provides an exposure function.

5. The method of claim 3, wherein the device identifier comprises a temporary identifier for the wireless communications device.

6. The method of claim 3, further comprising using the authentication information by the application server to authorize access to the wireless communications network.

7. The method of claim 1, further comprising sending at least a portion of the access information to the application server.

8. A wireless communications device configured to operate in a wireless communications network, the wireless communications device comprising:
a wireless interface over which wireless communications with one or more network nodes are carried out; and
a control circuit configured to perform the method of claim 1.

9. A method for exposing functions of the wireless communications network, the method comprising:
determining access information usable by an application server to manage a wireless communications device via an exposure function of the wireless communications network; and
transmitting a response message to the wireless communications device that is indicative of the access information.

10. The method of claim 9, further comprising receiving a request from the wireless communications device to provide the access information usable by the application server associated with the wireless communications device.

11. The method of claim 9, wherein the access information comprises one or more of:
a node identifier;
a device identifier; and/or
authentication information.

12. The method of claim 9, wherein determining the access information comprises at least one of:
generating a temporary identifier as the device identifier;
generating security credentials; and/or
locating a network node providing the exposure function associated with the wireless communications device.

13. The method of claim 9, further comprising:
receiving a service request from the application server, the service request being based at least in part on the access information; and
transmitting a service response to the application server.

14. The method of claim 13, further comprising receiving the service request at a network node providing the exposure function, the network node indicated by the node identifier.

15. The method of claim 13, wherein the service request relates to management of the wireless communications device, which is identifiable by the device identifier.

16. A network node configured to operate in a wireless communications network, the network node comprising:
an interface over which communications are carried out; and
a processor configured to perform the method of claim 9.

* * * * *